Jan. 11, 1966     C. F. PROUDMAN     3,228,531
SEPTIC TANK
Filed May 28, 1962                2 Sheets-Sheet 1

INVENTOR.
CHESTER F. PROUDMAN
BY *Mathias R. Kordolf*
ATTORNEY

Jan. 11, 1966   C. F. PROUDMAN   3,228,531
SEPTIC TANK

Filed May 28, 1962   2 Sheets-Sheet 2

INVENTOR.
CHESTER F. PROUDMAN
BY *Mathias R. Kondolf*
ATTORNEY

United States Patent Office 3,228,531
Patented Jan. 11, 1966

3,228,531
SEPTIC TANK
Chester F. Proudman, 17 Lake View Ave.,
Park Ridge, N.J.
Filed May 28, 1962, Ser. No. 198,039
2 Claims. (Cl. 210—532)

This invention relates to an improved septic tank for the treatment of sewage, particularly for use in locations not having community sewage systems.

The principal object of this invention is to provide a structure in which a septic tank of a given volume capacity is divided into a number of individual compartments each having a fractional capacity of the entire tank, whereby upon each addition of fresh sewage to the tank, a substantial rise in liquid head, increased velocity of flow and sewage agitation is obtained by the action of submerged open ports of restricted area which connect the compartments in series relation.

In the customary septic tank the flow of sewage through the tank is at a very slow and quite uniform rate, because of the large volume of the tank relative to the quantity of fresh sewage which enters from time to time. This large volume is generally contained in what amounts to one body of liquid so that normal additions of sewage merely raise the liquid level in the tank by a small amount, and do not materially increase the rate of flow or velocity of the sewage at any point in the tank. This results in dormant scum and sediment being accumulated in such conventional tanks to a greater extent than would occur if more efficient treatment was had and a greater proportion of scum and sediment was converted into effluent for discharge into the absorption field.

In this specification the term "sewage" is used as a general term applying to raw or fresh sewage as it enters the septic tank and also to the sewage components of scum, sediment, sludge and effluent where same are being processed in any combination. Where it is desired to indicate a separate component of the sewage the name of said sewage component is used.

A further object of this invention is to provide improved sewage treatment and digestion by structural means to produce local currents and agitation in the sewage while it remains in each compartment.

A further object of this invention is to provide, adjacent to the floor of the tank, submerged open ports of restricted area in the compartment walls, which ports by jet action produce agitation of a rolling and turning nature in the sediment on the tank floor and assist in its digestion and movement along said floor.

A further object of the invention is the provision of means to mix fresh sewage with sewage which has been partly decomposed in the tank and thereby obtain a continuous breaking up of scum and sludge formations to better digest same.

A further object of the invention is to provide a septic tank with compartments in a series arrangement for sewage treatment and having a lower unobstructed passage-way adjacent to the floor of the tank and an upper unobstructed substantially level passage-way for sewage through some of the compartments above said floor and below the top of the liquid in the tank compartments.

A further object of the invention is to provide open ports of restricted area along the above mentioned upper passage-way to agitate, produce eddy currents in and improve digestion in the flow of sewage through said tank.

To these and other ends the characteristic features and advantages of my improvements will more fully appear in the following description and the accompanying drawings in illustration thereof.

In the drawings, in which like reference numerals designate like parts:

Figure 1:
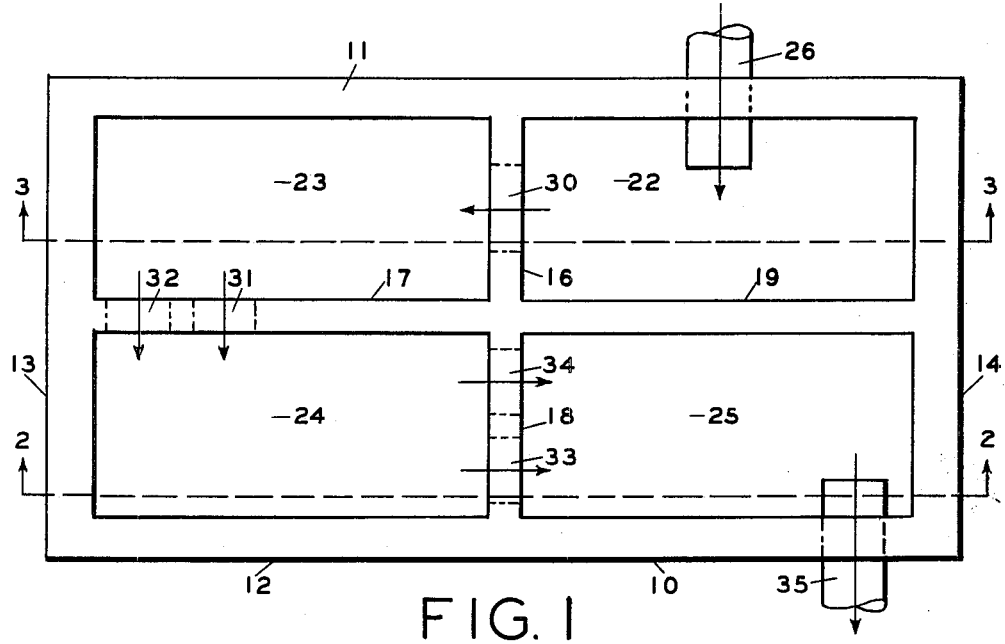
FIG. 1 is a diagrammatic plan view of the Septic Tank with the cover slabs removed.
Figure 3:
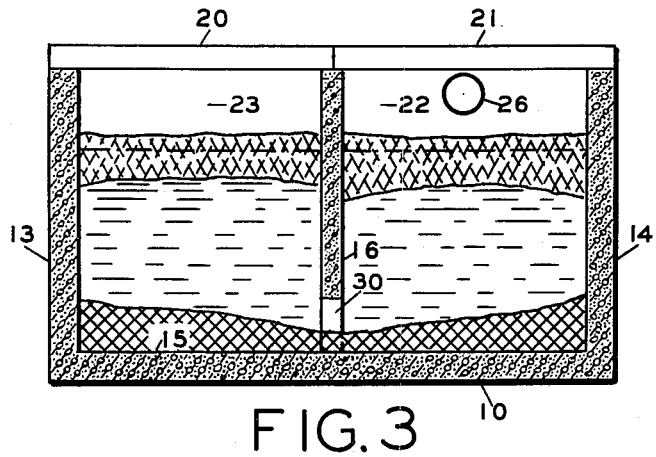

FIG. 3 is a view, to a smaller scale, taken on the vertical sectional plane 3—3 of FIG. 1. FIG. 3 shows the approximate distribution and depth of both the scum and the sludge in the tank compartments 22 and 23, after prolonged use of the tank.

Figure 4:
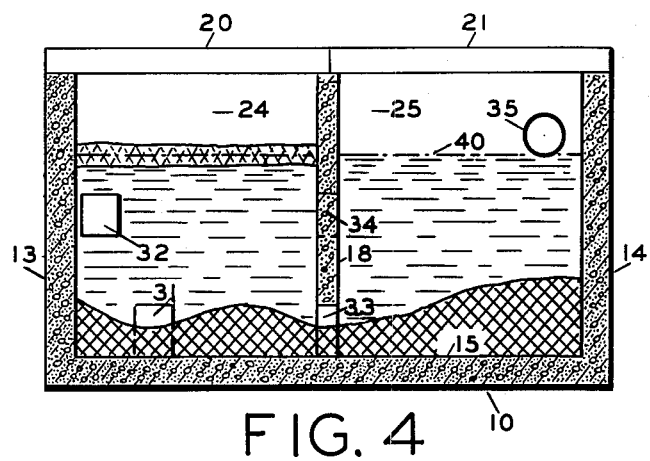

FIG. 4 is a view, to the same scale as FIG. 3, taken on the vertical sectional plane 2—2 of FIG. 1. FIG. 4 shows the approximate distribution and depth of both the scum and the sludge in the tank compartments 24 and 25, after prolonged use of the tank.

Figure 5:
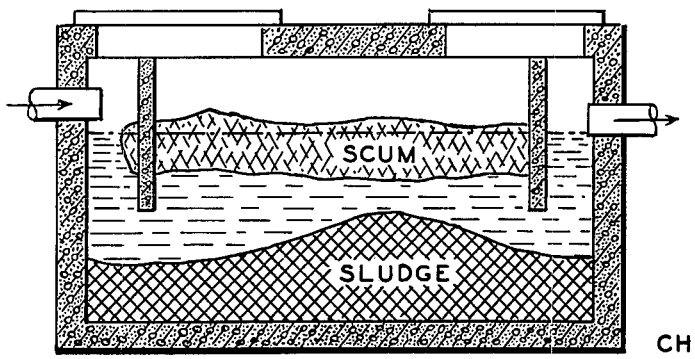

FIG. 5 is a vertical sectional view, of the same size and scale as FIGS. 3 and 4, of a typical household septic tank in general use and is a reproduction of an illustration of such a tank as shown and described in the "Manual of Septic Tank Practice," publication No. 526, page 27, of the U.S. Public Health Service (edition revised to June 1, 1961). The distribution and depth of both the scum and the sludge is drawn in FIG. 5 as shown in the said illustration.

Figure 2:
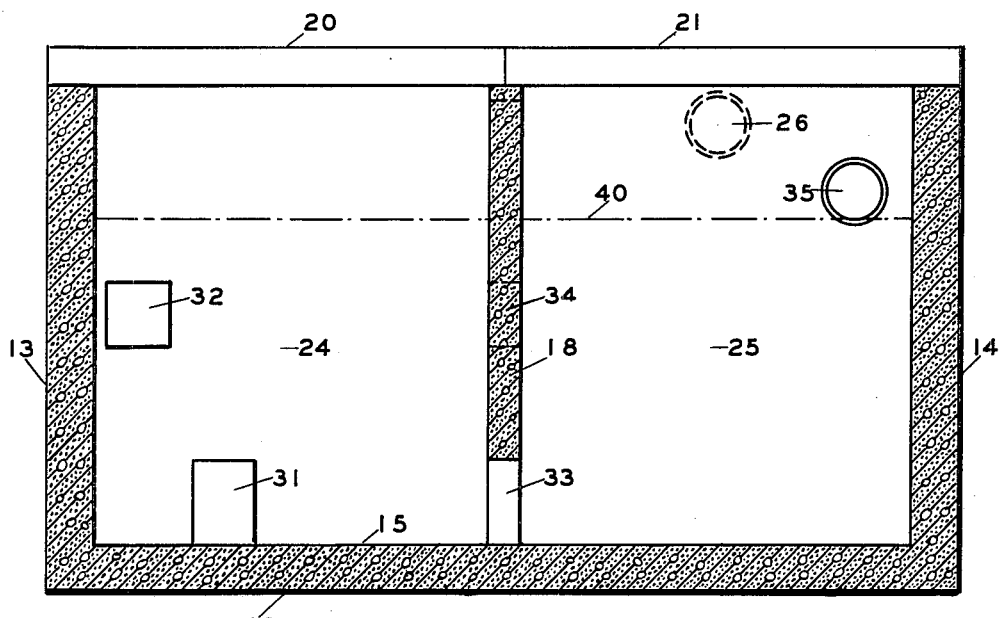
FIG. 2 is a view of the tank taken on the vertical sectional plane 2—2 of FIG. 1.

Referring to FIGS. 1 and 2, reference numeral 10 designates the septic tank and is comprised of exterior vertical side walls 11 and 12 joined with exterior vertical end walls 13 and 14.

The vertical interior partition walls 16, 17, 18 and 19 extend from the tank floor 15 to the top of the tank walls and may provide support for the cover slabs 20 and 21 which are placed over the tank 10. Gas passages may be used, if desired, between compartments and immediately under the cover slabs.

The tank and partition walls may be constructed of concrete, steel or of any other suitable material, and of a size to meet any requirements and local ordinances.

The partition walls 16, 17, 18 and 19 divide the tank into an initial inlet or mixing compartment 22, two intermediate compartments 23 and 24 and a terminal or outlet compartment 25.

As shown in the drawings, two intermediate compartments are used, but at least one, or more than two, may be used within the scope of the invention.

The inlet pipe 26 connects with a sewer line from the dwelling or other source of sewage to be treated.

The lower port 30 in partition wall 16 connects compartment 22 and compartment 23. The lower open port 31 and upper open port 32 in partition wall 17 connects compartment 23 with compartment 24. The lower port 33 and the upper port 34 in partition wall 18 connects compartment 24 with compartment 25.

From compartment 25 the outlet pipe 35 connects with a discharge line leading to an absorption field.

In use, sewage enters compartment 22 of tank 10 through the inlet pipe 26 and then passes through the lower port 30 into compartment 23. It then passes through the two ports 31 and 32 into compartment 24. It then passes through the two ports 33 and 34 into compartment 25 and thence to the absorption field through the outlet pipe 35. The arrows in FIG. 1 show the direction of sewage flow through the tank 10.

The first compartment 22 is a mixing compartment to obtain initial mixing and conditioning of the sewage by action on the scum and sediment formations.

Scum in a septic tank is formed of solids with entrained or captured gas which causes them to float. In the first compartment 22 the floating solids in the sewage rise and form a mat or blanket of scum at the liquid level in the compartment. The submerged part of this mat remains soft but the portion above the liquid level dries out and becomes hard until it is wet down by new liquid entering the tank. The inlet pipe 26 is raised or elevated well above the liquid level 40 and above the top of the scum mat and this causes new sewage entering the tank to fall upon the upper surface of the scum mat and soften same. The new liquid as it enters compartment 22 forms holes or openings into and through the scum mat and carries along some of the softer scum with it as it descends through the compartment. The soft submerged layer of scum moves into these openings and when this occurs part of the harder upper layer of the mat falls into the liquid and is softened thereby. In this manner the scum mat in compartment 22 is constantly renewed or rebuilt and detached portions are carried into the intermediate compartments 23 and 24 where digestion and conditioning of the scum continues.

Sludge in a septic tank accrues as a sediment of non-floating solids which, in the initial settling, are to a large degree digestible or capable of being converted into effluent fit for discharge from the tank.

Referring to FIG. 5 (which shows a typical design septic tank in general use) it will be noted that the sediment falls to the bottom of the tank and then remains dormant in this position. In this (FIG. 5) tank there is very little agitation or movement of the sediment and therefore little, if any, digestive or converting action on the sediment is obtained.

Referring to the drawings it will be noted that a lower unobstructed path is provided for sediment and sludge through the lower ports 30, 31 and 33. In the first compartment 22 the action of digestion starts. Settling of solids takes place in this compartment 22 and as this sediment accrues the port 30 is partly closed. Fresh sewage entering the compartment 22 mixes with the scum as described above and the mixture descends in compartment 22 and flows into compartment 23 through the port 30, agitating the settled materials and mixing with same. The jet action of the open port 30, of restricted area, produces agitating currents in both compartment 22 and in compartment 23.

The flow through the port 30 causes sediment to move into compartment 23 along the floor of the tank. The movement of sediment and digested sludge also takes place along the lower passage-way provided by the lower ports between compartments 23, 24 and 25.

The port 32 provides an upper path for effluent from compartment 23 into compartment 24 and the port 34 provides an upper path for effluent from compartment 24 into compartment 25.

The first compartment 22 of the series is a mixing compartment in which scum break-up and agitation and initial settling of heavier solids takes place. In the second and third intermediate compartments 23 and 24 most of the digestive and conditioning action takes place and in the fourth terminal compartment 25 the effluent liquid clarifies in readiness for discharge into the absorption field.

It will be noted that the compartments of applicant's tank are individual and separated by solid walls. The sewage, in passing through the tank, must flow between compartments through submerged open ports of relatively small size. This results in increased velocity in the flow of sewage through said ports—a type of limited jet action—and produces currents in the body of sewage in each compartment. The increased velocity and the currents produced thereby, result in agitation of the sewage which is an important advantage in treating and digesting sewage.

With improved digestion a greater percentage of the sewage treated in a tank becomes effluent for discharge into the absorption field. Over a period of tank operation, this reduction in volume of the solids remaining in the tank, results in a correspondingly longer time between required cleanings of the tank.

Reference to FIGS. 1 and 2 will show that the lower ports 31 and 33 are larger in area than the upper ports 32 and 34. The area of each port is restricted to a size adapted to control the flow of effluent therethrough in relation to the resistance to current flow of the effluent in the zone into which the port discharges. For example, the less mobile effluent in the lower horizontal zone has a substantially greater resistance to current flow and agitation than the effluent in the upper horizontal zone and therefore the lower ports have a larger area. The port areas are balanced, with regard to size and pressure factors, against the flow resistance of the effluent encountered in the respective zones. The ports in each compartment wall are completely submerged and are of a size to secure the limited jet action described above and thereby combat the tendency for sewage to lay dormant in the compartments.

To understand the function of the ports which form the lower path for the effluent and the function of the ports which form the upper path for the effluent, we should consider the tank in operation. The effluent in the tank may then be visualized as being divided into three horizontal zones of action. The upper zone includes the scum layer which forms on the surface of the effluent. The lower zone includes the sediment and sludge which gathers on the floor of the tank. The middle zone, between the upper and lower zones, is liquid effluent with scum and sludge sediment entrained therein. The zones thus defined will be referred to in the claims at the end of this specification.

The restricted ports in the lower zone cause jet-action currents in the effluent which agitate and move the effluent and entrained sludge sediment through the lower zone of the tank. The restricted ports in the upper zone cause jet-action currents in the effluent which agitate and move the effluent and entrained scum through the upper zone of the tank. The middle zone, having no ports, has less agitation of the effluent. Sediment from the middle zone falls into the more active lower zone.

In each zone, throughout the tank, efficient digestive and conditioning action is carried on to reduce the sewage and clarify the effluent for discharge from the tank. The structure described herein practically eliminates inactive or dead spots in the septic tank.

In the conventional tank shown in sectional view in FIG. 5, and in many tanks of the prior art, the passage-ways provided under and through baffles and compartment walls are very large, often of the full width of the tank and of such height that the velocity of the sewage flow through such large openings or ports is about the same as in an open tank. Practically no currents are produced in the body of sewage by such structure and very little agitation of the sewage is obtained in same.

In some septic tanks screens or filters are used in the ports between compartments. Such screens or filters greatly reduce the velocity of flow through the port and therefore cause much less agitation of the sewage than obtained by applicant with his use of open ports of restricted area as described above.

As shown in FIG. 1 the compartments are placed in a series arrangement to provide, in plan view, a U shaped path to obtain a reverse flow of sewage through the tank. The compartments may, if desired, be placed in line to give a flow in one direction and be within the scope of the invention. The U shaped path is preferred for the following reasons:

(a) The use of a number of individual compartments placed in lapped position in the septic tank to provide a reverse or U shaped path for the sewage flowing through the tank gives a much greater length of travel for the sewage as compared with a straight path. This increased length of travel results in more efficient operation of the tank and is an important advantage. For example, in a tank six feet long by four feet wide a straight path for the sewage through the tank (as used in conventional tanks like that shown in FIG. 5) will give a travel length of approximately eight feet, whereas by the use of compartments in lapped position to obtain a reverse or U shaped path for the sewage, as disclosed herein, the travel length will be approximately sixteen feet or about twice as long a path.

(b) The lapping of the compartments reduces heat loss by a reduction in the area of the exterior surface of the tank walls for a tank of a given volume capacity. The higher operating temperature thus obtained during the treatment of the sewage, increases the efficiency of the tank.

Having now described and illustrated one form of my invention, I wish it to be understood that my invention is not to be limited to the specific form or arrangement of parts herein described and shown.

I claim:

1. In a septic tank for the treatment of residential household sewage, a structure to provide for a directed flow a effluent substantially within an upper horizontal zone and to provide for an independently directed flow of effluent substantially within a lower horizontal zone adjacent to the floor of said tank and comprising at least;
    (a) a floor and a cover for said tank.
    (b) an initial compartment, of a series, having an elevated inlet for sewage effluent to flow into said compartment;
    (c) a plurality of connected compartments in said series for further treatment of said effluent;
    (d) lower ports connecting all compartments in the series, said ports being adjacent to the floor of the said tank and confined entirely within the said lower lower horizontal zone of said tank;
    (e) upper ports connecting all compartments, except the initial compartment, said ports being confined entirely within the said upper horizontal zone of said tank;
    (f) the ports in said upper horizontal zone being vertically separated from the ports in said lower horizontal zone to obtain substantially independent flow of effluent in each of said zones and
    (g) an outlet for effluent from the last compartment in said tank, the plurality of compartments in said tank being separated from one another by partition means which include the upper and lower ports, said partition means being so constructed as to prevent flow of effluent between said plurality of compartments except through said upper and lower ports.

2. In a septic tank for the treatment of residential household sewage, a structure to provide for a directed flow of effluent substantially within an upper horizontal zone and to provide for an independently directed flow of effluent substantially within a lower horizontal zone adjacent to the floor of said tank and comprising at least;
    (a) a floor and a cover for said tank;
    (b) an initial compartment, of a series, having an elevated inlet for sewage effluent to flow into said compartment;
    (c) a plurality of connected compartments in said series for further treatment of said effluent;
    (d) lower ports connecting all compartments in the series, said ports being adjacent to the floor of the said tank and confined entirely within the said lower horizontal zone of said tank;
    (e) upper ports connecting all compartments, except the initial compartment, said ports being confined entirely within the said upper horizontal zone of said tank;
    (f) the ports in said upper horizontal zone being vertically separated from the ports in said lower horizontal zone to obtain substantially independent flow of effluent in each of said zones;
    (g) each of said ports being of an area adapted to control the flow of effluent therethrough, in relation to the flow resistance of the effluent within the zone into which said port discharges and
    (h) an outlet for effluent from the last compartment in said tank, the plurality of compartments in said tank being separated from one another by partition means which include the upper and lower ports, said partition means being so constructed as to prevent flow of effluent between said plurality of compartments execept through said upper and lower ports.

References Cited by the Examiner

UNITED STATES PATENTS 3,031,083  4/1962  Schreiber _____ 210—532

FOREIGN PATENTS 827,874  2/1938  France.
886,674  7/1943  France.
1,242,220  8/1960  France.
705,419  4/1941  Germany.

REUBEN FRIEDMAN, *Primary Examiner.*

HERBERT L. MARTIN, *Examiner.*

UNITED STATES PATENT OFFICE
CERTIFICATE OF CORRECTION

Patent No. 3,228,531              January 11, 1966

Chester F. Proudman

It is hereby certified that error appears in the above numbered patent requiring correction and that the said Letters Patent should read as corrected below.

Column 5, line 21, for "a" read -- of --.

Signed and sealed this 10th day of January 1967.

(SEAL)

Attest:

ERNEST W. SWIDER
Attesting Officer

EDWARD J. BRENNER
Commissioner of Patents